United States Patent
Kim et al.

(10) Patent No.: US 11,867,854 B2
(45) Date of Patent: Jan. 9, 2024

(54) HANDLE STRUCTURE OF RADIATION DETECTING DEVICE

(71) Applicant: BIOSENSTECH INC., Gyeonggi-do (KR)

(72) Inventors: Bo Chan Kim, Gyeonggi-do (KR); Han Bin Jang, Gyeonggi-do (KR)

(73) Assignee: BIOSENSTECH INC., Gyeonggi-do (KR)

( * ) Notice: Subject to any disclaimer, the term of this patent is extended or adjusted under 35 U.S.C. 154(b) by 198 days.

(21) Appl. No.: 17/564,231

(22) Filed: Dec. 29, 2021

(65) Prior Publication Data
US 2023/0133565 A1    May 4, 2023

(30) Foreign Application Priority Data

Oct. 28, 2021   (KR) .................. 10-2021-0145751

(51) Int. Cl.
*A45C 13/26*   (2006.01)
*G01T 7/00*   (2006.01)

(52) U.S. Cl.
CPC ...................................... *G01T 7/00* (2013.01)

(58) Field of Classification Search
CPC .. G01T 7/00; G01T 1/29; G03B 42/04; A61B 6/00; A61B 6/4283; A45F 5/10; A45F 2005/1033; B65D 2525/285; B65D 2525/287; B65G 7/12; B25G 3/00; B25G 3/04; B25G 3/08; B25G 3/10; B25G 3/18; B25G 3/28; B25B 23/16
See application file for complete search history.

(56) References Cited

U.S. PATENT DOCUMENTS

| | | | | | |
|---|---|---|---|---|---|
| 2,537,750 | A | * | 1/1951 | Gretschel | A45C 13/22 292/49 |
| 3,484,894 | A | * | 12/1969 | Fletcher | A47B 95/02 16/422 |
| 4,185,363 | A | * | 1/1980 | David | B64D 17/32 24/645 |
| 4,827,567 | A | * | 5/1989 | Beach | F16B 21/16 16/DIG. 40 |

(Continued)

FOREIGN PATENT DOCUMENTS

| | | | | |
|---|---|---|---|---|
| CN | 108609343 A | * | 10/2018 | ............... B65G 7/12 |
| GB | 1338628 A | * | 11/1973 | |

(Continued)

*Primary Examiner* — Chuck Y Mah
(74) *Attorney, Agent, or Firm* — JCIPRNET

(57) ABSTRACT

A handle structure is detachably coupled to a radiation detecting device. The handle structure includes: a body to be gripped by a user; first and second latch shafts each having one end protruding from the body to be inserted into and coupled to a coupling groove formed on the radiation detecting device; a connecting shaft connecting the other ends of the first and second latch shafts to each other; first and second push shafts brought into contact with the radiation detecting device and vertically moving upwards; a first connecting portion connecting the first push shaft to the first latch shaft; a second connecting portion connecting the second push shaft to the second latch shaft; and a button moved by manipulation of a user to release a coupling state of the first and second latch shafts.

11 Claims, 8 Drawing Sheets

(56) References Cited

U.S. PATENT DOCUMENTS

| | | | | | |
|---|---|---|---|---|---|
| 5,002,418 | A | * | 3/1991 | McCown | H05K 7/1412 |
| | | | | | 410/82 |
| 5,005,255 | A | * | 4/1991 | Pare | E05B 1/0015 |
| | | | | | 16/429 |
| 5,029,922 | A | * | 7/1991 | DiNapoli | A45F 5/10 |
| | | | | | 294/34 |
| 5,289,614 | A | * | 3/1994 | Hartz | B64G 4/00 |
| | | | | | 294/212 |
| 5,485,654 | A | * | 1/1996 | Nespodzany, Jr. | B64G 1/641 |
| | | | | | 16/422 |
| 5,992,031 | A | * | 11/1999 | Shirai | H05K 5/023 |
| | | | | | 33/290 |
| 7,396,158 | B2 | * | 7/2008 | Grosse | G21K 4/00 |
| | | | | | 378/189 |
| 8,540,294 | B2 | * | 9/2013 | Dowler | B65G 7/12 |
| | | | | | 294/148 |
| 2019/0277985 | A1 | * | 9/2019 | Choi | A61B 6/4283 |

FOREIGN PATENT DOCUMENTS

| | | | |
|---|---|---|---|
| JP | H10274809 A | * | 10/1998 |
| KR | 1020130040757 | | 4/2013 |
| SU | 426343 A | * | 10/1974 |

* cited by examiner (a)

(b)

(a)

(b)

HANDLE STRUCTURE OF RADIATION DETECTING DEVICE

CROSS-REFERENCE TO RELATED APPLICATION

This application claims the priority benefits of Korean application no. 10-2021-0145751, filed on Oct. 28, 2021. The entirety of the above-mentioned patent application is hereby incorporated by reference herein and made a part of this specification.

FIELD

Embodiments of the present invention relate to a handle structure detachably coupled to a radiation detecting device, and more particularly to a handle structure of a radiation detecting device, which can be detachably coupled to the radiation detecting device in any direction to allow a user to rapidly and stably carry the radiation detecting device.

BACKGROUND

Radiation refers to alpha rays (α-rays), beta rays (β-rays), gamma rays (γ-rays), X-rays (X rays), and the like emitted upon radioactive decay of a radioactive element having an unstable atomic nucleus. Since radiation provides no color, taste, sound, smell or feeling, the human sensory organs cannot detect radiation. Thus, a separate detector must be used to detect radiation.

Conventionally, radiation is mainly used for medical purposes, such as diagnosis of diseases and the like, through implementation of images of an internal structure of the human body (e.g., chest, abdomen, pelvis, skull, and the like) by analyzing attenuation of X-rays passing through an object using the phenomenon that X-rays (X-rays) are attenuated according to material, density and thickness of the object while passing through the object. In recent years, radiation is used not only in the medical field, but also in various fields, such as industrial and security fields, materials science fields, astrophysics, and air/water pollution monitoring.

With expansion of the application field of radiation, a radiation imaging location has also been expanded from indoors to outdoors and an imaging target has also been diversified from the human body to various materials.

Thus, there is increasing demand for a portable radiation detecting device in the art.

Accordingly, as a typical radiation detecting device, an X-ray detector is provided with a handle such that a user can easily carry the X-ray detector by gripping the handle. However, since a coupling direction of the handle to the X-ray detector is predetermined in one direction of the typical X-ray detector, the coupling direction of the handle must be adjusted with respect to the X-ray detector, thereby causing difficulty in rapid coupling between the X-ray detector and the handle.

Moreover, conventionally, since the handle is slid into a groove formed on the X-ray detector upon coupling of the handle to the X-ray detector, the handle can be coupled to the X-ray detector only in one direction, thereby making it difficult to achieve rapid connection or separation between the handle and the X-ray detector and providing low coupling stability due to a clearance therebetween. As a result, the X-ray detector can be destructed when falling to the ground due to disconnection between the handle and the X-ray detector while the X-ray detector is carried by a user.

That is, such a typical handle structure for improvement in portability of the radiation detecting device cannot guarantee coupling stability.

RELATED LITERATURE

Patent Document

KR Patent Laid-open Publication No. 10-2013-0040757 (Apr. 24, 2013)

SUMMARY

Embodiments of the present invention are conceived to solve the above problems in the art and provide a handle structure of a radiation detecting device, which can be detachably coupled to the radiation detecting device in any direction, can secure convenience in coupling between a handle and the radiation detecting device, and allows the handle to be rapidly detachably coupled to the radiation detecting device, thereby solving the problems of the typical radiation detecting device.

Embodiments of the present invention provide a handle structure of a radiation detecting device, which can minimize a clearance between the radiation detecting device and a handle while improving coupling stability therebetween.

In accordance with one aspect of the present invention, a handle structure of a radiation detecting device includes: a body to be gripped by a user; first and second latch shafts each having one end protruding from the body to be inserted into and coupled to a coupling groove (including hole) formed on the radiation detecting device; a connecting shaft connecting the other ends of the first and second latch shafts to each other; first and second push shafts brought into contact with the radiation detecting device and vertically moving upwards; a first connecting portion connecting the first push shaft to the first latch shaft; a second connecting portion connecting the second push shaft to the second latch shaft; and a button moved by manipulation of a user to release a coupling state of the first and second latch shafts, wherein one end of each of the first and second push shafts protrudes from the body and is brought into contact with the radiation detecting device to force the first and second push shafts to move vertically upon coupling to the radiation detecting device; and, upon vertical movement of the first and second push shafts, the first and second latch shafts are rotated by a predetermined angle through the first and second connecting portions and a latch portion formed on the one end of each of the first and second latch shafts is rotated to be latched to the radiation detecting device.

In one embodiment, the connecting portion may be composed of one of a triaxial link and a sliding cam.

In accordance with another aspect of the present invention, a handle structure of a radiation detecting device includes: a body to be gripped by a user; first and second latch shafts each having one end protruding from the body to be inserted into and coupled to a coupling groove formed on the radiation detecting device; a connecting shaft connecting the other ends of the first and second latch shafts to each other; protrusions protruding from the first and second latch shafts, respectively; a stopper formed on an inner surface of the body and restricting rotational locations of the protrusions formed on the first and second latch shafts; and a button moved by manipulation of a user to release a coupling state of the first and second latch shafts, wherein the button is slid to allow the first and second latch shafts to rotate through the connecting shaft and a latch portion formed on one end of each of the first and second latch shafts is rotated to be coupled to the radiation detecting device after passing through the coupling groove of the radiation detecting device such that the latch portions are rotated and latched to the radiation detecting device when slide driving of the button is released.

In one embodiment, the latch portion may be provided at a lower side thereof with a slanted portion to guide coupling of the latch portion to the coupling groove of the radiation detecting device.

In one embodiment, each of the first and second latch shafts may be provided with at least one bearing to support the corresponding latch shaft while preventing the latch shaft from shaking.

In one embodiment, the button may be provided at one side thereof with a spring and one or both of the first push shaft and the second push shaft may be provided at an upper portion thereof with a spring such that the body is prevented from shaking by pushing force from the spring on the upper portion of the push shaft and the first and second latch shafts are rotated and then secured by tension of each of the springs.

In one embodiment, the first and second latch shafts may be simultaneously rotated through the connecting shaft by the same angle in the same direction.

According to the present invention, the handle structure of the radiation detecting device can be detachably coupled to the radiation detecting device in any direction, can secure convenience in coupling between the handle and the radiation detecting device, and allows the handle to be detachably coupled to the radiation detecting device, thereby securing convenience in conveyance of the radiation detecting device.

According to the present invention, the handle structure of the radiation detecting device adopts a shaft rotation latch mechanism instead of a sliding coupling mechanism to minimize a clearance between the radiation detecting device and the handle while improving coupling stability therebetween, thereby preventing the radiation detecting device from being damaged when falling to the ground.

DRAWINGS

The above and other aspects, features and advantages of the present invention will become apparent from the following description of embodiments given in conjunction with the accompanying drawings, in which.

DETAILED DESCRIPTION

Figure 1:
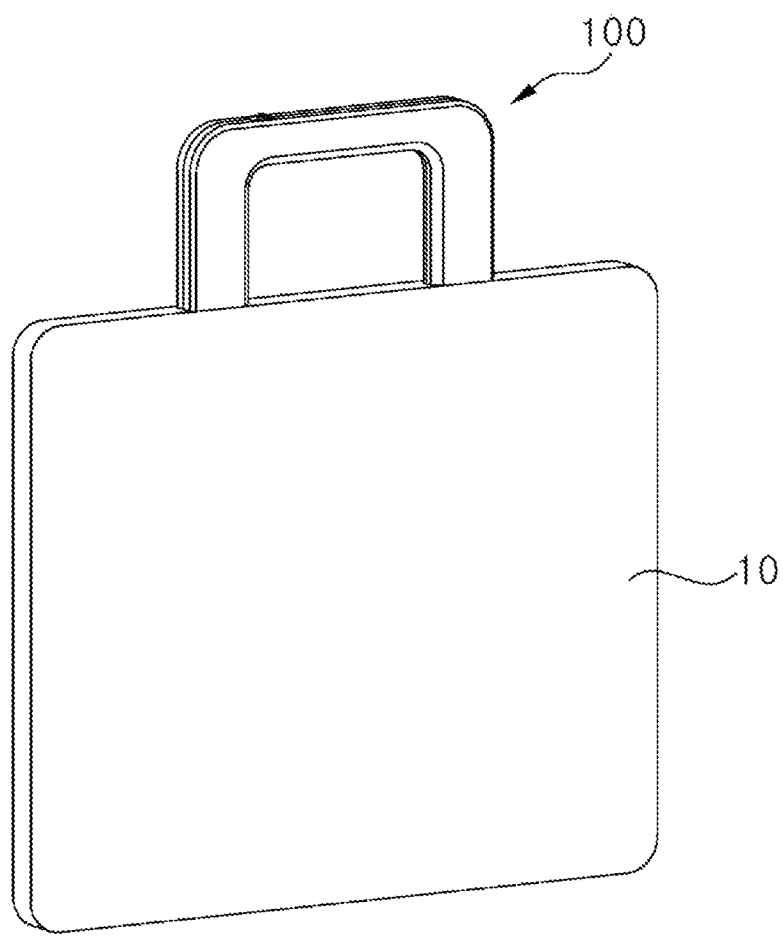
FIG. 1 is a schematic perspective view of a handle structure of a radiation detecting device according to one embodiment of the present invention, which is coupled to the radiation detecting device.

Hereinafter, embodiments of the present invention will be described with reference to the accompanying drawings. Like components will be denoted by like reference numerals throughout the specification.

It should be understood that the following embodiments can be modified in various ways and the present invention is not limited thereto.

Figure 2:
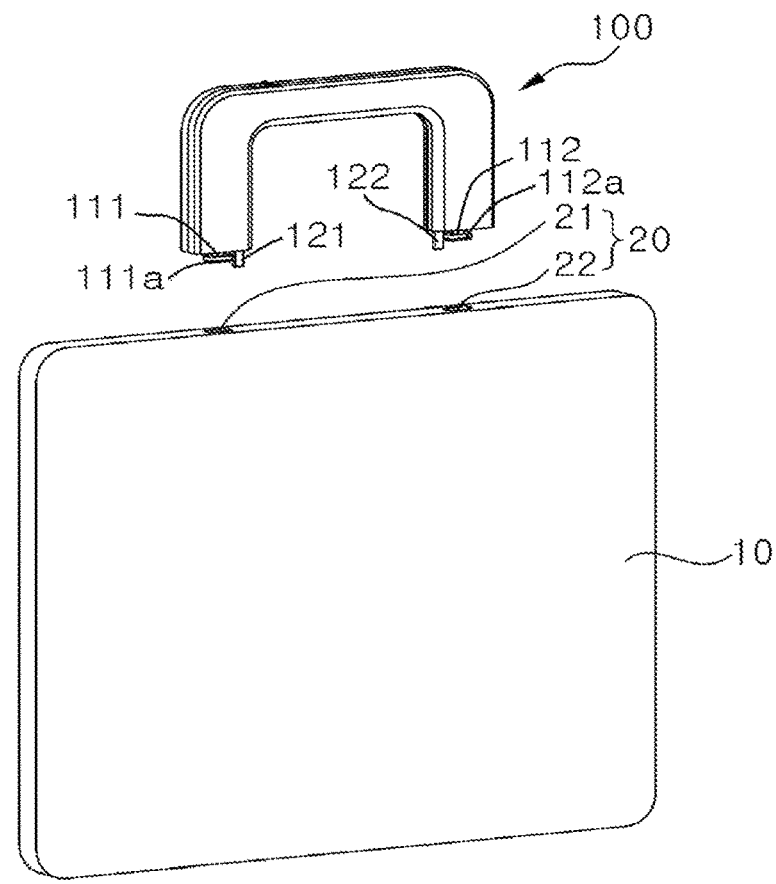
FIG. 2 is a schematic perspective view of the handle structure according to the embodiment of the present invention, which is separated from the radiation detecting device.
Figure 3:
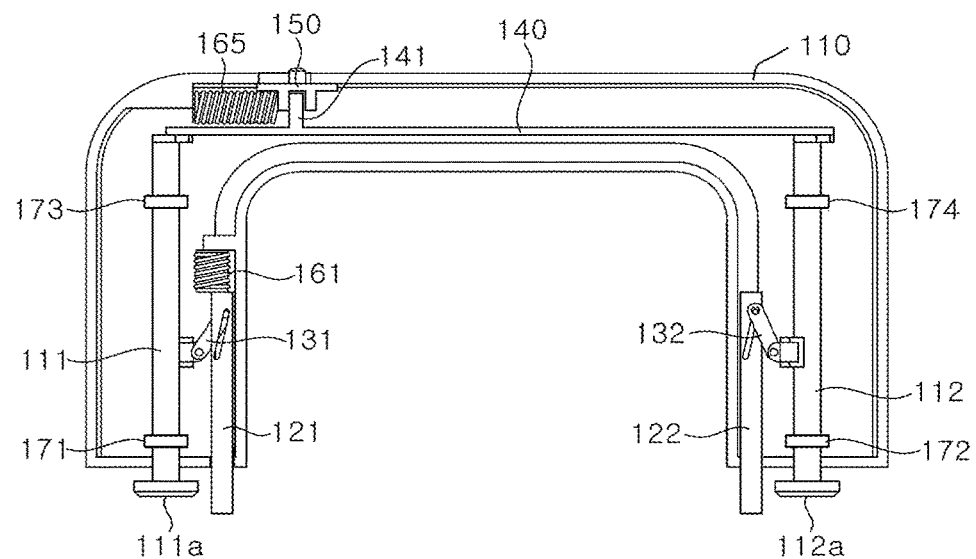
FIG. 3 and FIG. 4 are views of a first embodiment of a handle structure of a radiation detecting device according to the present invention.
Figure 4:
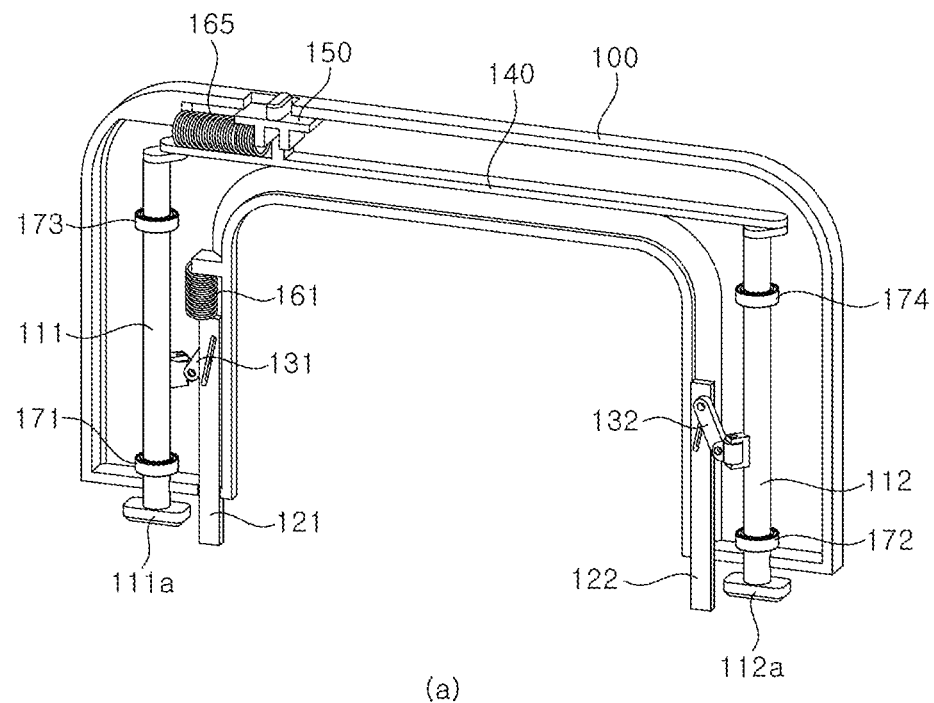
Figure 4:
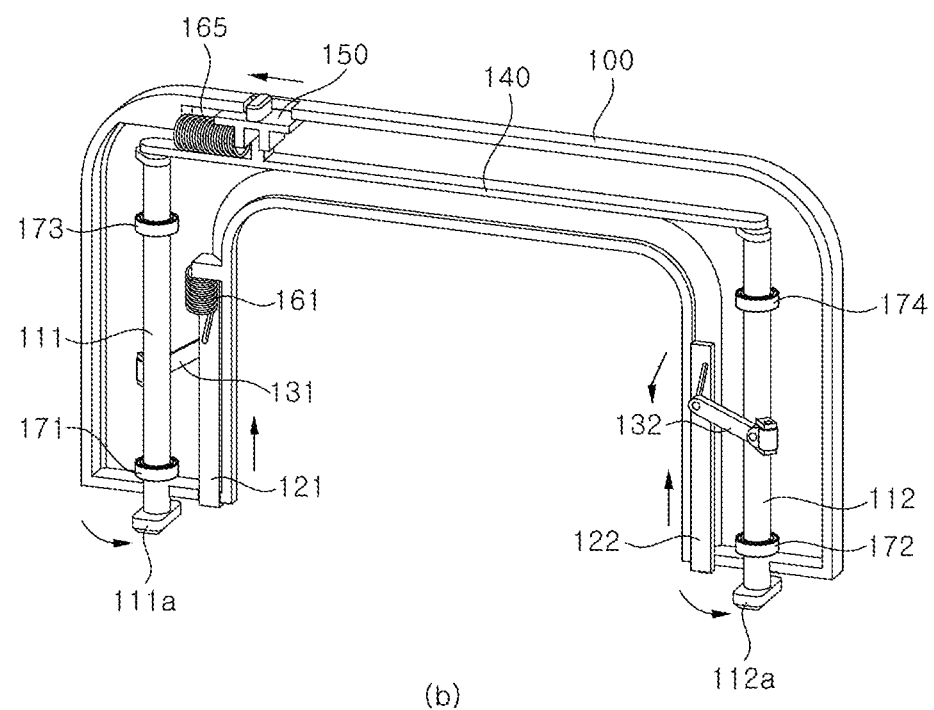
Figure 5:
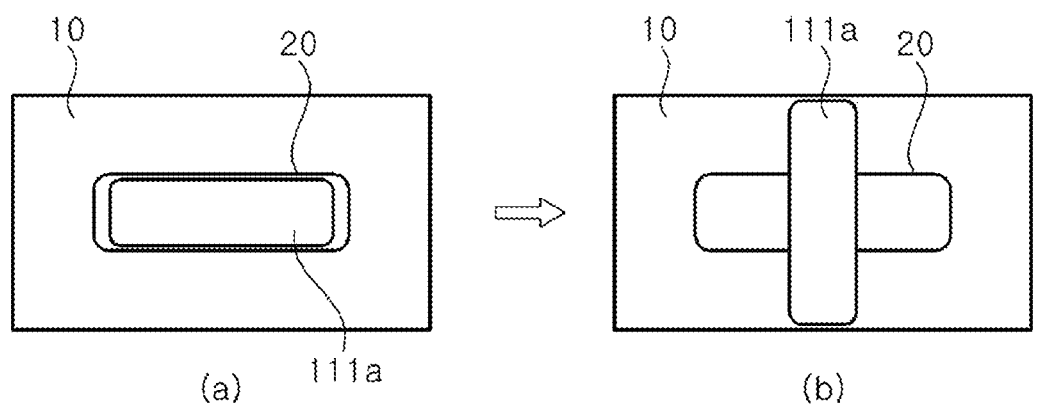
FIG. 5 is a conceptual view of the handle structure coupled to the radiation detecting device according to the present invention.
Figure 6:
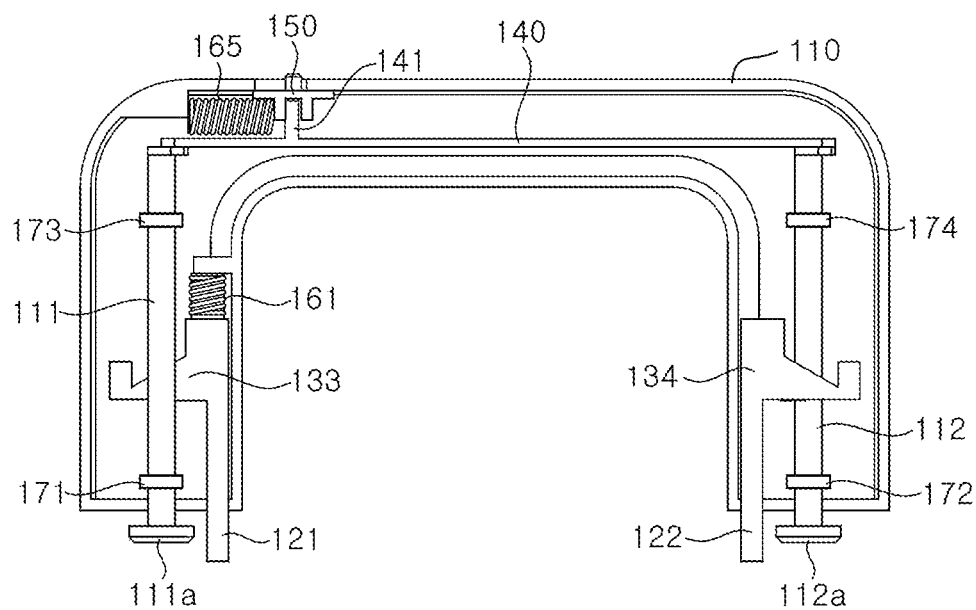
FIG. 6 and FIG. 7 are views of a second embodiment of a handle structure of a radiation detecting device according to the present invention.
Figure 7:
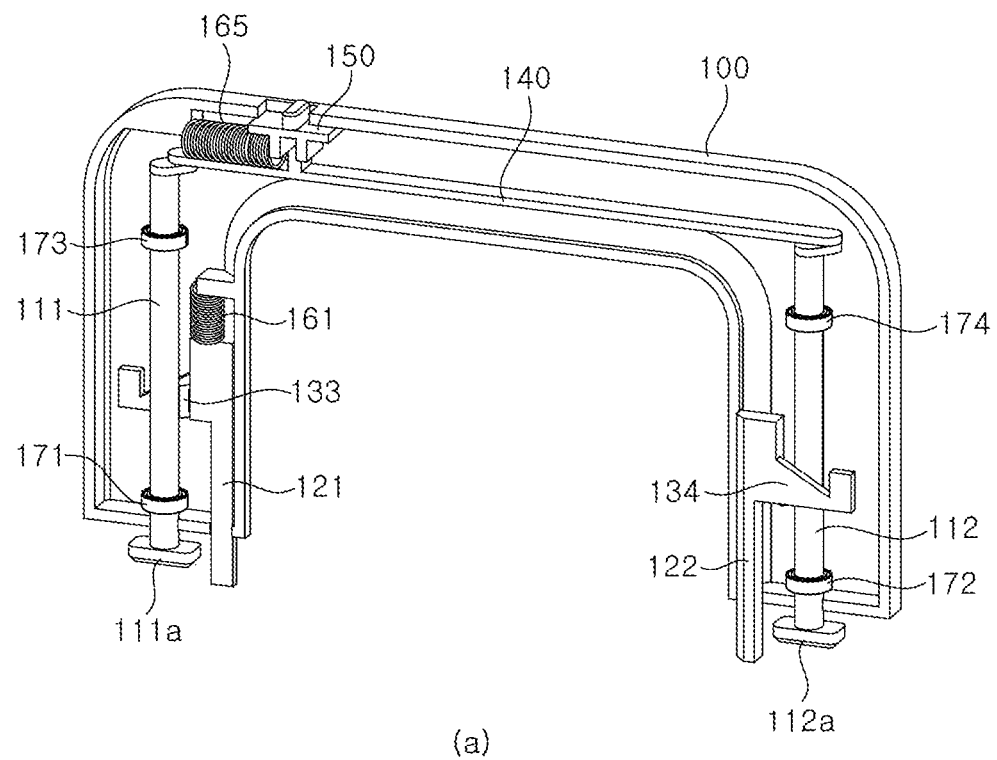
Figure 7:
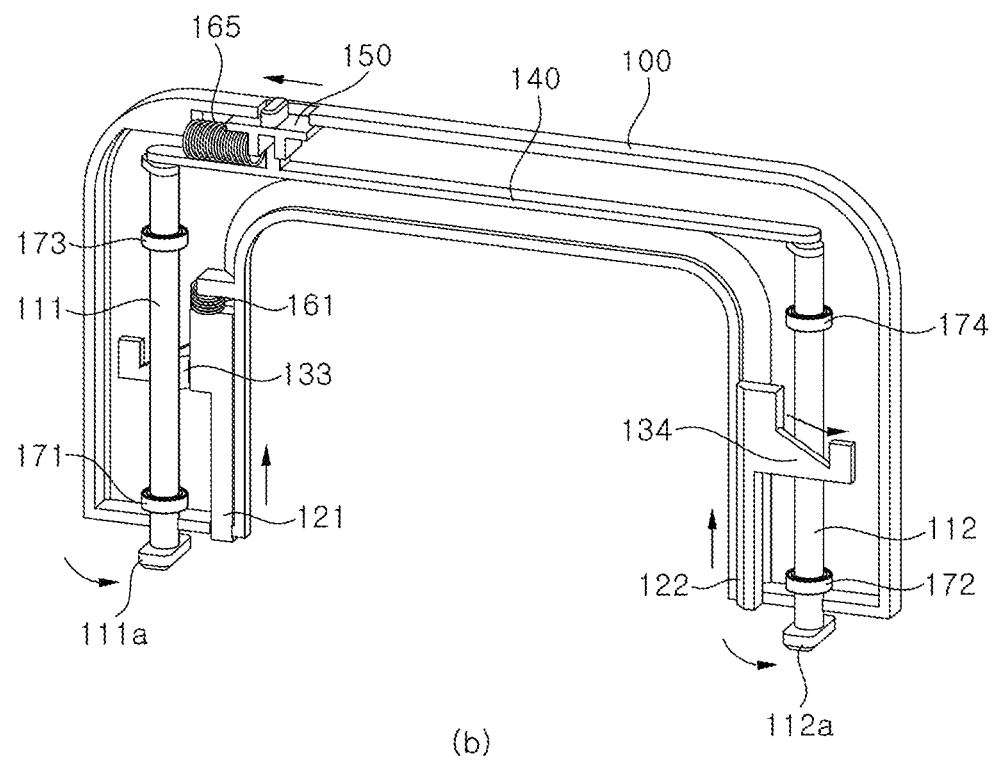
Figure 8:
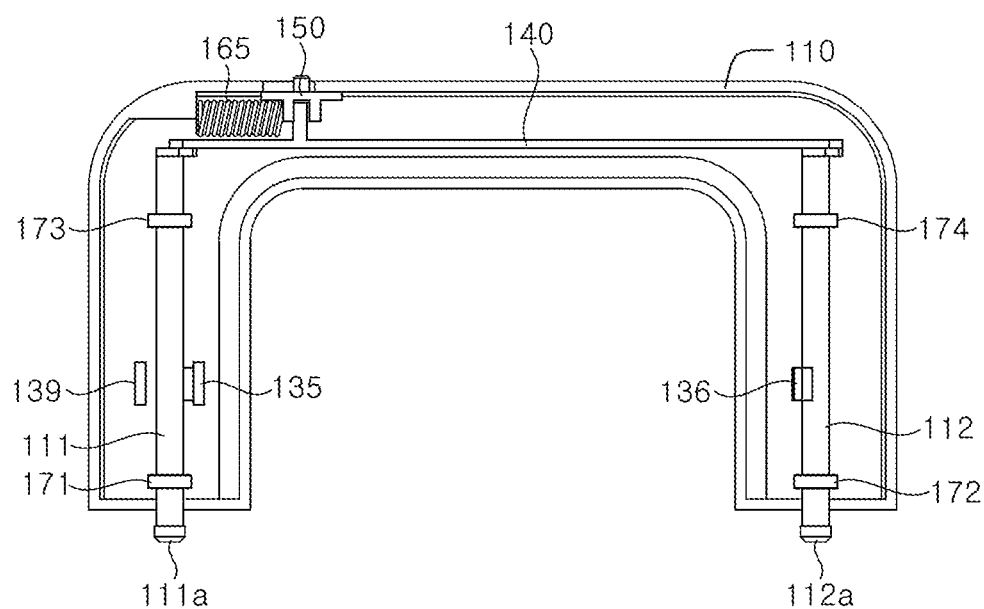
FIG. 8 and FIG. 9 are views of a third embodiment of a handle structure of a radiation detecting device according to the present invention.
Figure 9:
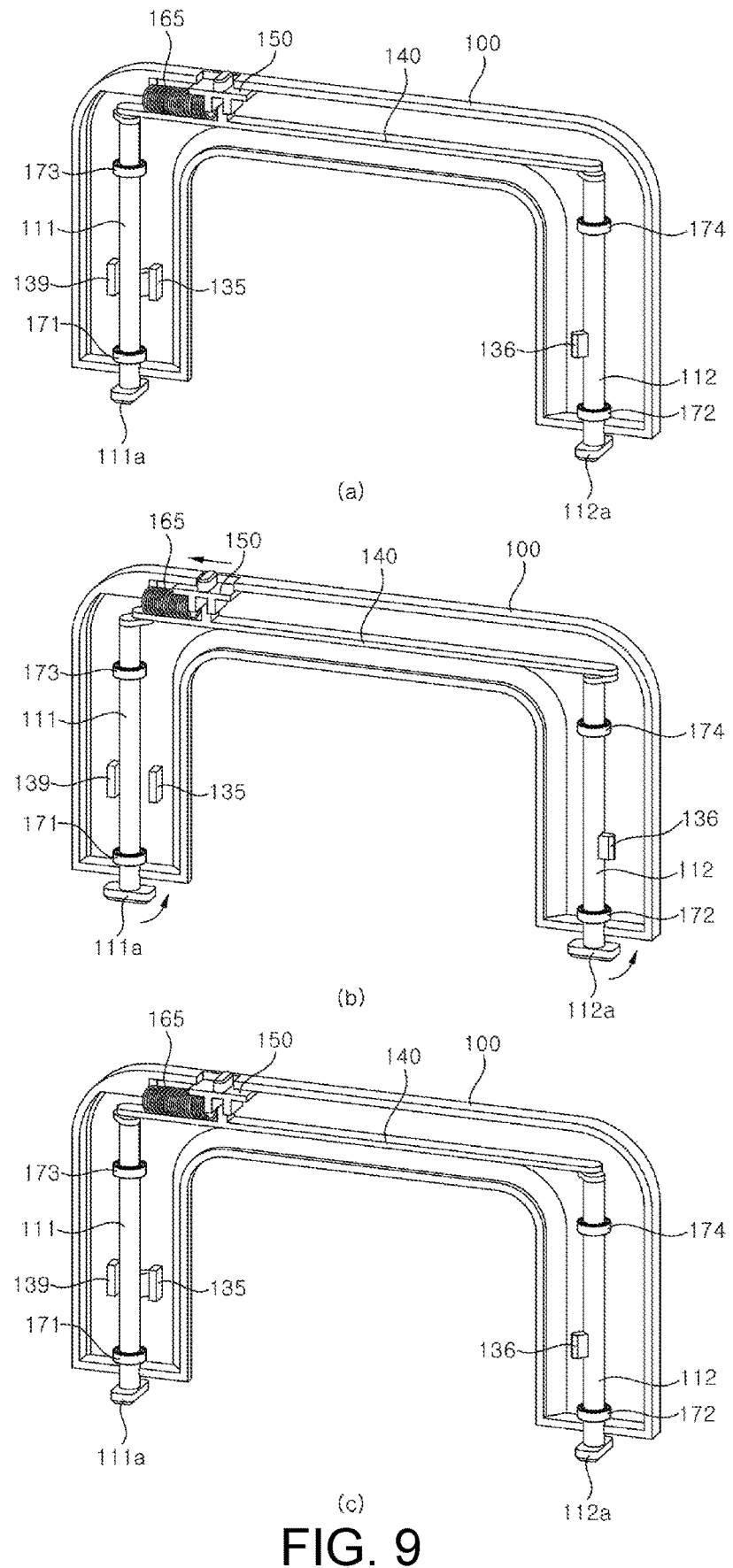
Figure 10:
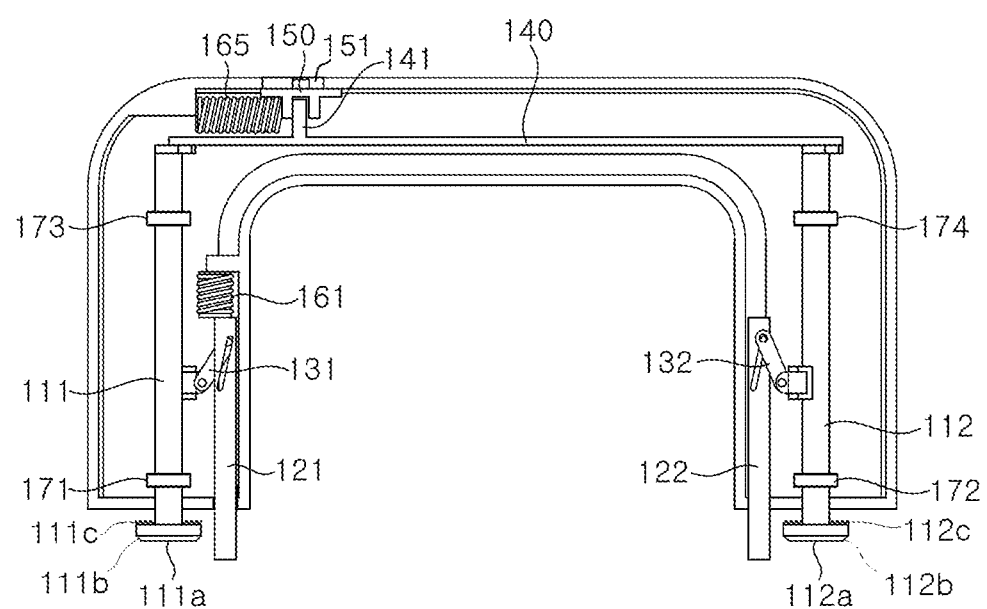
FIG. 10 is a view of a handle structure of a radiation detecting device according to another embodiment of the present invention.

FIG. 1 is a schematic perspective view of a handle structure of a radiation detecting device according to one embodiment of the present invention, which is coupled to the radiation detecting device; FIG. 2 is a schematic perspective view of the handle structure according to the embodiment of the present invention, which is separated from the radiation detecting device; FIG. 3 and FIG. 4 are views of a first embodiment of a handle structure of a radiation detecting device according to the present invention; FIG. 5 is a conceptual view of the handle structure coupled to the radiation detecting device according to the present invention; FIG. 6 and FIG. 7 are views of a second embodiment of a handle structure of a radiation detecting device according to the present invention; FIG. 8 and FIG. 9 are views of a third embodiment of a handle structure of a radiation detecting device according to the present invention; and FIG. 10 is a view of a handle structure of a radiation detecting device according to another embodiment of the present invention.

Referring to FIG. 1 to FIG. 10, a handle structure of a radiation detecting device according to the present invention will be described.

First, referring to FIG. 1 to FIG. 5, a handle structure 100 according to one embodiment of the present invention is detachably coupled to a radiation detecting device 10 and includes: a body 110 to be gripped by a user to stably carry the radiation detecting device 10; first and second latch shafts 111, 112 each having one end protruding from the body 110 to be inserted into and coupled to a coupling groove (including hole) 20 formed on the radiation detecting device; a connecting shaft 140 connecting the other ends of the first and second latch shafts 111, 112 to each other; first and second push shafts 121, 122 brought into contact with the radiation detecting device 10 and vertically moving upwards; a first connecting portion 131 connecting the first push shaft 121 to the first latch shaft 111; a second connecting portion 132 connecting the second push shaft 122 to the second latch shaft 112; and a button 150 moved by manipulation of a user to release a coupling state of the first and second latch shafts 111, 112.

One end of each of the first and second push shafts 121, 122 protrudes from the body and is brought into contact with the radiation detecting device 10 to move vertically upon coupling to the radiation detecting device 10.

Upon vertical movement of the first and second push shafts 121, 122, the first and second latch shafts 111, 112 are rotated by a predetermined angle through the first and second connecting portions 131, 132 and latch portions 111a, 112a formed on the ends of the first and second latch shafts 111, 112 are rotated to be latched to the radiation detecting device 10.

The latch portions 111a, 112a formed on the ends of the first and second latch shafts 111, 112 are inserted into coupling grooves 21, 22 formed on the radiation detecting device 10, respectively. As the latch portions 111*a*, 112*a* are inserted into the coupling grooves 21, 22, the first and second push shafts 121, 122 are brought into contact with an upper end of the radiation detecting device 10 and vertically move upwards.

FIG. 3 and FIG. 4 are views of a first embodiment of the handle structure of the radiation detecting device according to the present invention, in which each of the first and second connecting portions 131, 132 is composed of a triaxial link.

FIG. 4(*a*) shows the handle structure 100 not coupled to the radiation detecting device 10 and FIG. 4(*b*) shows the handle structure 100 coupled to the radiation detecting device 10.

Upon coupling of the handle structure 100 to the radiation detecting device 10, among the first and second latch shafts 111, 112 protruding from a lower side of the body 110 that can be gripped by a user and the first and second push shafts 121, 122, the first and second latch shafts 111, 112 are inserted into the coupling grooves and the first and second push shafts 121, 122 are brought into contact with the upper end of the radiation detecting device 10 to vertically move upwards, as shown in FIG. 4(*b*).

By vertical movement of the first and second push shafts 121, 122, the first latch shaft 111 is rotated through the first connecting portion 131 connected to the first push shaft 121 and the second latch shaft 112 is rotated through the second connecting portion 132 connected to the second push shaft 122.

The first and second latch shafts 111, 112 are rotated by 90 degrees and the latch portions 111*a*, 112*a* formed on the ends of the first and second latch shafts 111, 112 are rotated to be securely latched to the radiation detecting device 10.

Each of the first and second latch shafts 111, 112 is provided with at least one bearing to support the corresponding latch shaft while preventing the corresponding latch shaft from shaking.

At least one bearing 171 to 174 is provided to the latch shaft and is received inside the body 110. The bearings 171 to 174 may be provided to lower sides 171, 172 of the connecting portions 131, 132, to upper sides 173, 174 thereof, or to both sides thereof.

FIG. 5(*a*) shows the latch portion 111*a* inserted into the coupling groove 20 and FIG. 5(*b*) shows the latch portion 111*a* secured to the coupling groove 20 through latch coupling after the latch portion 111*a* is inserted into and rotated in the coupling groove 20.

Specifically, when the latch portion 111*a* is inserted into the coupling groove 20, the latch portion 111*a* is not in a state of being rotated. Then, the latch portion 111*a* is secured to the radiation detecting device 10 through rotation by 90 degrees and latch coupling to the coupling groove 20.

FIG. 6 and FIG. 7 are views of a second embodiment of the handle structure of the radiation detecting device according to the present invention, in which each of the connecting portions 133, 134 is composed of a sliding cam.

Accordingly, the connecting portion may be composed of various mechanisms, such as a triaxial link or a sliding cam, which can connect the vertically movable push shaft to the latch shaft to rotate the latch shaft to a predetermined angle.

FIG. 7(*a*) shows the handle structure 100 not coupled to the radiation detecting device 10 and FIG. 7(*b*) shows the handle structure 100 coupled to the radiation detecting device 10.

Upon coupling of the handle structure 100 to the radiation detecting device 10, among the first and second latch shafts 111, 112 protruding from the lower side of the body 110 that can be gripped by a user and the first and second push shafts 121, 122, the first and second latch shafts 111, 112 are inserted into the coupling grooves and the first and second push shafts 121, 122 are brought into contact with the upper end of the radiation detecting device 10 to vertically move upwards, as shown in FIG. 7(*b*).

By vertical movement of the first and second push shafts 121, 122, the first latch shaft 111 is rotated through the first connecting portion 131 connected to the first push shaft 121 and the second latch shaft 112 is rotated through the second connecting portion 132 connected to the second push shaft 122.

The first and second latch shafts 111, 112 are rotated by 90 degrees and the latch portions 111*a*, 112*a* formed on the ends of the first and second latch shafts 111, 112 are rotated to be securely latched to the radiation detecting device 10.

In addition, the button 150 may be provided at one side thereof with a spring 165 and one or both of the first push shaft 121 and the second push shaft 122 may be provided at an upper portion thereof with a spring 161.

With this structure, the body 110 can be prevented from shaking by pushing force from the spring 161 on the upper portion of the push shaft and the first and second latch shafts 111, 112 are rotated and then secured by tension of each of the springs.

Further, the first and second latch shafts 111, 112 may be simultaneously rotated through the connecting shaft 140 by the same angle in the same direction.

Here, the rotation angle of each of the first and second latch shafts may be set to 90 degrees in order to allow the first and second latch shafts to be latched to the radiation detecting device 10 after insertion into the coupling grooves 20 and the first and second latch shafts may be separated from the radiation detecting device through the coupling grooves 20 by manipulation of the button 150 to release the first and second latch shafts from the coupling groove 20 through rotation to original locations thereof.

Further, the button 150 is connected to a connecting terminal 141 protruding upwards from the connecting shaft 140 and rotates the latch shafts connected to both ends of the connecting shaft by 90 degrees to release a latched state of the latch shafts upon sliding of the button.

FIG. 8 and FIG. 9 are views of a third embodiment of the handle structure of the radiation detecting device according to the present invention, which includes: a body 110 to be gripped by a user; first and second latch shafts 111, 112 each having one end protruding from the body 110 to be inserted into and coupled to a coupling groove 21 or 22 formed on the radiation detecting device; a connecting shaft 140 connecting the other ends of the first and second latch shafts 111, 112 to each other; and a button 150 moved by manipulation of a user to release a coupling state of the first and second latch shafts 111, 112.

FIG. 9(*a*) shows the handle structure 100 not coupled to the radiation detecting device 10, FIG. 9(*b*) shows latch portions 111*a*, 112*aa* in a rotated state for coupling to the coupling grooves 21, 22 of the radiation detecting device 10, and FIG. 9(*c*) shows the handle structure 100 coupled to the radiation detecting device 10.

The button 150 is slid to allow the first and second latch shafts 111, 112 to rotate through the connecting shaft 140 and the latch portion 111*a* or 112*a* formed on one end of each of the first and second latch shafts 111, 112 is rotated by 90 degrees to be coupled to the radiation detecting device after passing through the coupling groove 21 or 22 of the radiation detecting device. When slide driving of the button is released, the latch portions 111*a*, 112*a* are rotated by 90 degrees and latched to the radiation detecting device 10.

In addition, first and second protrusions 135, 136 may protrude from outer circumferential surfaces of the first and second latch shafts 111, 112, respectively; and a stopper 139 may be formed on an inner surface of the body 110 to restrict rotational locations of the protrusions 135, 136 formed on the first and second latch shafts 111, 112. The stopper 139 may be placed at a location corresponding to the first latch shaft and/or a location corresponding to the second latch shaft 112 on the inner surface of the body 110.

With this structure, the stopper restricts rotation of the first and second latch shafts 111, 112 to 90 degrees upon coupling or separation of the handle, thereby enabling stable coupling of the handle and easy disconnection thereof.

In addition, each of the latch portions 111a, 112a is provided at a lower side thereof with a slanted portion 111b or 112b to guide coupling of the latch portions 111a, 112a to the coupling grooves 21, 22 of the radiation detecting device such that the latch portions 111a, 112a can be easily coupled to the coupling grooves 21, 22, respectively.

FIG. 10 is a view of a handle structure of a radiation detecting device according to another embodiment of the present invention, in which the latch portions 111a, 112a are provided with the slanted portions 111b, 112b and further provided with resilient members 111c, 112c formed of a rubber, a urethane resin, a silicone resin, or the like on upper ends thereof, which will contact the radiation detecting device 10 when coupled to the radiation detecting device 10, to prevent the body 110 from shaking upon conveyance of the radiation detecting device while securing coupling stability.

In addition, the button 150 is formed to the same height as or a lower height than the body 110 instead of protruding from an upper end of the body 110, thereby preventing malfunction of the button 150 when the handle is gripped by a user.

Since the button 150 not protruding from the upper end of the body 110 does not allow easy manipulation by a user, the button 150 may be provided with a manipulation groove 151 such that a user can insert a finger into the manipulation groove upon manipulation of the button 150, thereby facilitating manipulation of the button 150 to slide.

According to the present invention, the handle structure of the radiation detecting device can be detachably coupled to the radiation detecting device in any direction, can secure convenience in coupling between the handle and the radiation detecting device, and allows the handle to be detachably coupled to the radiation detecting device, thereby securing convenience in conveyance of the radiation detecting device.

In addition, according to the present invention, the handle structure of the radiation detecting device adopts a shaft rotation latch mechanism instead of a sliding coupling mechanism to minimize a clearance between the radiation detecting device and the handle while improving coupling stability therebetween, thereby preventing the radiation detecting device from being damaged when falling to the ground.

Although some embodiments have been described herein, it should be understood that these embodiments are provided for illustration only and are not to be construed in any way as limiting the present invention, and that various modifications, changes, and alterations can be made by those skilled in the art without departing from the spirit and scope of the invention. Therefore, the scope of the present invention should be defined by the appended claims and equivalents thereto.

What is claimed is:

1. A handle structure detachably coupled to a radiation detecting device, the handle structure comprising:
   a body to be gripped by a user;
   first and second latch shafts each having one end protruding from the body to be inserted into and coupled to a coupling groove formed on the radiation detecting device;
   a connecting shaft pivotally connecting the other ends of the first and second latch shafts to each other;
   first and second push shafts brought into contact with the radiation detecting device and vertically moving upwards;
   a first connecting portion connecting the first push shaft to the first latch shaft;
   a second connecting portion connecting the second push shaft to the second latch shaft; and
   a button coupled to said connecting shaft and moved to release a coupling state of the first and second latch shafts by manipulation of a user,
   wherein one end of each of the first and second push shafts protrudes from the body and is brought into contact with the radiation detecting device to force the first and second push shafts to move vertically upon coupling to the radiation detecting device; and,
   upon vertical movement of the first and second push shafts, the first and second latch shafts are rotated by a predetermined angle through the first and second connecting portions and a latch portion formed on the one end of each of the first and second latch shafts is rotated to be latched to the radiation detecting device.

2. The handle structure according to claim 1, wherein the connecting portion is composed of one of a triaxial link and a sliding cam.

3. The handle structure according to claim 1, wherein the latch portion is provided at a lower side thereof with a slanted portion to guide coupling of the latch portion to the coupling groove of the radiation detecting device.

4. The handle structure according to claim 1, wherein each of the first and second latch shafts is provided with at least one bearing to support the corresponding latch shaft while preventing the latch shaft from shaking.

5. The handle structure according to claim 1, wherein the button is provided at one side thereof with a spring; one or both of the first push shaft and the second push shaft are provided at an upper portion thereof with a spring such that the body is prevented from shaking by pushing force from the spring on the upper portion of the push shaft; and the first and second latch shafts are rotated and then secured by tension of each of the springs.

6. The handle structure according to claim 1, wherein the first and second latch shafts are simultaneously rotated through the connecting shaft by the same angle in the same direction.

7. A handle structure detachably coupled to a radiation detecting device, the handle structure comprising:
   a body to be gripped by a user;
   first and second latch shafts each having one end protruding from the body to be inserted into and coupled to a coupling groove formed on the radiation detecting device;
   a connecting shaft pivotally connecting the other ends of the first and second latch shafts to each other;
   protrusions protruding from the first and second latch shafts, respectively;

a stopper formed on an inner surface of the body and restricting rotational locations of the protrusions formed on the first and second latch shafts; and a button moved by manipulation of a user to release a coupling state of the first and second latch shafts, wherein the button coupled to said connecting shaft and is slid to allow the first and second latch shafts to rotate through the connecting shaft and a latch portion formed on one end of each of the first and second latch shafts is rotated to be coupled to the radiation detecting device after passing through the coupling groove of the radiation detecting device such that the latch portions are rotated and latched to the radiation detecting device when slide driving of the button is released.

8. The handle structure according to claim 7, wherein the latch portion is provided at a lower side thereof with a slanted portion to guide coupling of the latch portion to the coupling groove of the radiation detecting device.

9. The handle structure according to claim 7, wherein each of the first and second latch shafts is provided with at least one bearing to support the corresponding latch shaft while preventing the latch shaft from shaking.

10. The handle structure according to claim 7, wherein the button is provided at one side thereof with a spring, and the first and second latch shafts are rotated and then secured by tension of the spring.

11. The handle structure according to claim 7, wherein the first and second latch shafts are simultaneously rotated through the connecting shaft by the same angle in the same direction.

* * * * *